United States Patent [19]
Doornhein et al.

[11] Patent Number: 4,587,557
[45] Date of Patent: May 6, 1986

[54] FIELD NUMBER CONVERSION CIRCUIT

[75] Inventors: Laurens Doornhein; Johannes G. Raven; Petrus W. G. Welles; Marcellinus J. J. C. Annegarn; Antonius H. H. J. Nillesen, all of Eindhoven, Netherlands

[73] Assignee: U.S. Philips Corporation, New York, N.Y.

[21] Appl. No.: 534,443

[22] Filed: Sep. 21, 1983

[30] Foreign Application Priority Data

Sep. 22, 1982 [NL] Netherlands ................. 8203668

[51] Int. Cl.⁴ .............................................. H04N 7/01
[52] U.S. Cl. ...................................... 358/140; 358/11
[58] Field of Search ................................ 358/140, 11

[56] References Cited
U.S. PATENT DOCUMENTS 3,073,896 1/1963 James ..................... 358/140 X
4,276,565 12/1983 Dalton et al. ................. 358/140
4,322,750 3/1982 Lord et al. ................... 358/140

Primary Examiner—Howard W. Britton
Assistant Examiner—Victor R. Kostak
Attorney, Agent, or Firm—Thomas A. Briody; William J. Streeter; Edward W. Goodman

[57] ABSTRACT

In a field number conversion circuit, the mutual positions of the horizontal and vertical synchronizing signal pattern in a field of the television signal to be converted are measured by means of a measuring circuit (201) and these mutual positions are adequately transferred by means of a coupling circuit (203) to a corresponding field in the converted television signal. Reading the field memories (125, 127) used during the conversion operation is preferably effected at a clock frequency (at 53) which is not coupled to the clock frequency (at 23) used during the writing operation.

8 Claims, 5 Drawing Figures

FIELD NUMBER CONVERSION CIRCUIT

BACKGROUND OF THE INVENTION

The invention relates to a field number conversion circuit for converting a television signal to be converted, having a first field frequency, into a converted television signal having a second field frequency, comprising a field memory circuit for writing therein, for each field the television signal to be converted, a read clock signal generator which is frequency-coupled to the horizontal deflection frequency of the converted television signal, a control circuit for controlling writing and reading of the memory circuit, a circuit for obtaining display synchronizing signals for the converted television signals and a correction circuit for obtaining for each field, according to the position of the television signal to be converted in an associated picture, a corresponding position of the converted television signal in an associated picture.

"Elektronica", 1982, No. 4, pages 27–33 discloses a field number conversion circuit of the above-described type, in which the frequencies of the clock signals and of the synchronizing signals are coupled to each other and the correction circuit applies an additional deflection current to the vertical deflection coils for correcting, for an interlaced picture, the converted television signal in the picture to be displayed. This conversion circuit is only suitable for converting standard signals having a fixed number of interlaced fields and lines.

SUMMARY OF THE INVENTION

It is an object of the invention to provide a field number conversion circuit which is also suitable for converting television signals of interlaced or non-interlaced fields having non-standard line numbers as they are generated, for example, by video recorders or television games.

According to the invention, a field number conversion circuit of the type described in the opening paragraph, is characterized in that the correction circuit comprises a measuring circuit for measuring in each field the time interval between a field synchronizing signal of the television signal to be converted and an instant corresponding to a certain position in the relevant field of the picture, and for adequately transferring this time interval to a coupling circuit for providing a coupling between the start of the reading operation and the display synchronizing signals of the converted television signal so that, in a field of the converted television signal, the mutual positions of the vertical and horizontal synchronizing signals and of the converted television signal correspond, except for a deviation which is substantially constant from field to field of the signal to be converted, to the mutual positions of the vertical and horizontal synchronizing signals and of the television signal to be converted in the corresponding field of the television signal to be converted.

The above-mentioned feature of measuring the time interval from an instant which corresponds to a certain point in the field relative to the vertical synchronizing signal of the relevant field and adequately transferring this time interval to the converted television signal renders the converter circuit suitable for different line numbers per field, both even and odd and interlaced as well as non-interlaced.

In accordance with a further embodiment of the invention the said instant in the field to be converted is located at a time interval of more than ten line periods from the vertical synchronizing signal so as to obtain, also for television signals in which the position of the first horizontal synchronizing signals in the television signal to be converted evidence significant variations, a proper position of the synchronizing signal pattern used to display the converted television signal relative to the converted television signal.

DESCRIPTION OF THE DRAWINGS

The invention will now be further described by way of example with reference to the accompanying drawings.

In the drawings.

DESCRIPTION OF THE PREFERRED EMBODIMENTS

Figure 1:
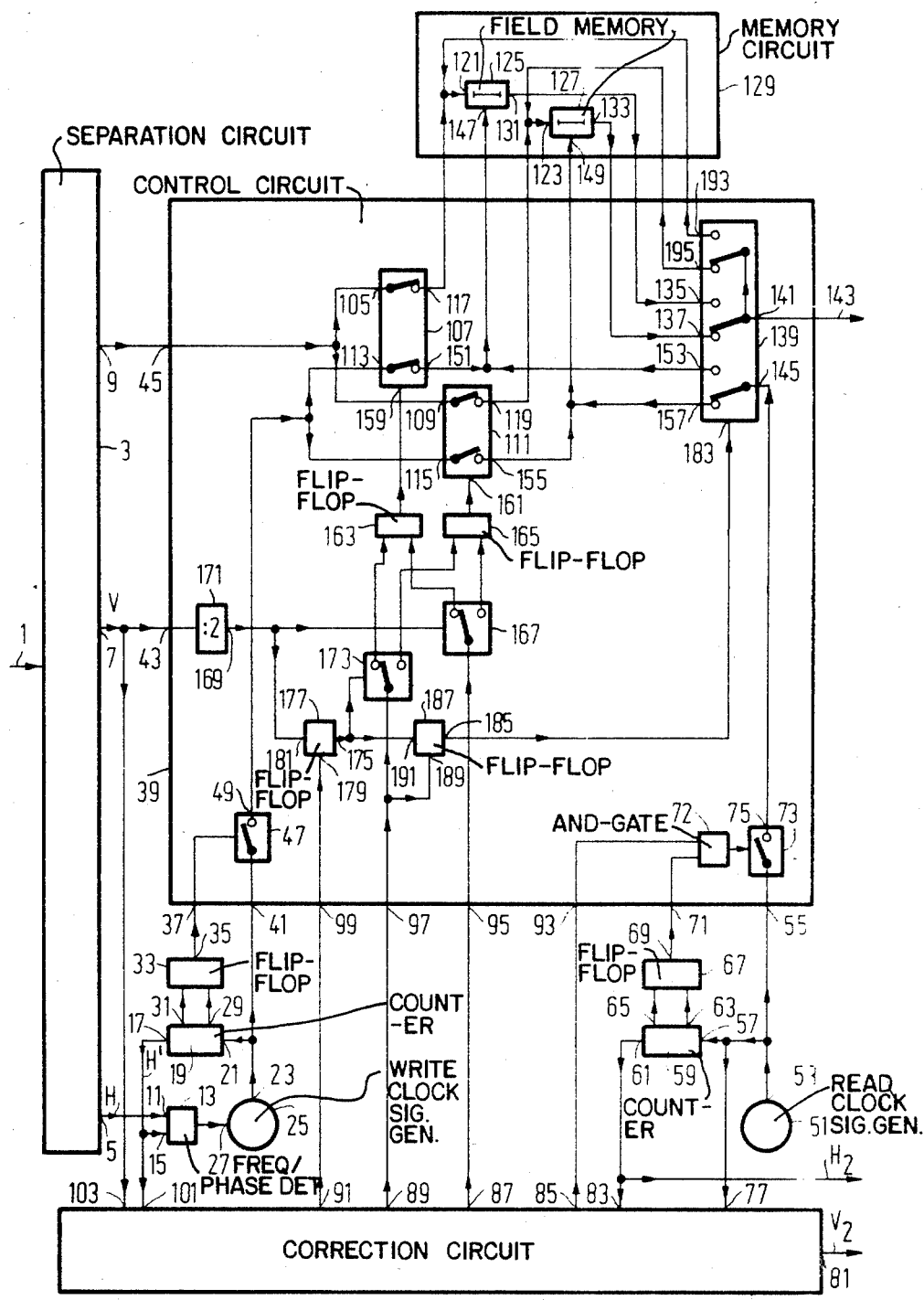
FIG. 1 illustrates, by means of a block diagram, a possible embodiment of a field number conversion circuit in accordance with the invention.

A television signal to be converted is applied to an input 1 of a separation circuit 3. From outputs 5 and 7, respectively, the separation circuit 3 supplies horizontal and vertical synchronizing signals H, V, respectively, which are separated from the television signal to be converted; from an output 9 it supplies the television signal to be converted from which, if desired, the synchronizing signals have been removed.

The horizontal synchronizing signals H appearing at the output 5 are applied to an input 11 of a frequency and phase detector 13. A further input 15 of the frequency and phase detector 13 receives a signal H' from an output 17 of a counter 19 which functions as a frequency divider.

An input 21 of the counter 19 is connected to an output 23 of a write clock signal generator 25, a control signal input 27 of which is connected to an output of the frequency and phase detector 13.

As a result thereof, the write clock signals from the generator 25 and the signal H' are frequency and phase-coupled to the horizontal synchronizing signals H. The time constant of the control is adapted to the nature of the synchronizing signals to be processed.

The counter 19 determines the number of clock signal periods in each line period of the television signal to be converted. A short period of time after the counter 19 has reached the zero position, an output 29 of the counter 19 applies a pulse to a flip-flop 33, and an output 31 applies a pulse to this flip-flop 33 a short period of time before the counter 19 reaches the subsequent zero position. In response thereto, this flip-flop 33 supplies, in the period of time located between these pulses, denoted the active line writing period hereinafter, a logic one-signal from an output 35. This signal is applied to an input 37 of a control circuit 39.

An input 41 of the control circuit 39 is connected to the output of the write clock signal generator 25, and an input 43 to the output 7 and an input 45 to the output 9 of the separation circuit 3.

In the control circuit 39, a switch 47 is connected to the input 41, which switch 47 is operated by the signal at the input 37 of the control circuit 39 and is closed during the active line writing period, as a result of which the switch 47 supplies the write clock signal at its output 49.

In addition, the conversion circuit has a read clock signal generator 51, which, in this case, is non-synchronized, so it is free-running and supplies a read clock signal at an output 53. This read clock signal is applied to an input 55 of the control circuit 39 and to an input 57 of a counter 59, which functions as a frequency divider. The length of the counter 59 is similar to the length of the counter 19 and each time its final position is reached, it supplies at an output 61, a pulse $H_2$ which is used as a synchronizing signal for the horizontal deflection of a display device, not shown, for the converted television signal.

The counter 59 has an output 63 and an output 65, which are connected to a flip-flop 67 which as a result thereof supplies a logic one-signal at an output 69 during a period of time, denoted the active line reading period hereinafter, located between slightly after the starting position and slightly before the final position of the counter 59. This signal is applied to an input 71 of the control circuit 39 and operates, via an AND-gate 72, a switch 73 which is connected to the input 55 and which as a result thereof supplies in each active line reading period, a read clock signal at its output 75 when the signal at the other input of the AND-gate 72 has the logic value "one".

In addition, the output 53 of the read clock signal generator 51 is connected to an input 77 of a correction circuit 79, which supplies at an output 81 the vertical synchronizing signals $V_2$ for displaying the converted television signal. The correction circuit 79 ensures the proper position of these signals $V_2$ relative to the horizontal synchronizing signals $H_2$ in correspondence with the signals in a field of the television signal to be converted. The operation of the correction circuit 79 will be described hereinafter with reference to FIG. 2.

The correction circuit 79 has an input 83 connected to the output 61 of the counter 59, outputs 85, 87, 89 and 91, connected to respective inputs 93, 95, 97 and 99 of the control circuit 39, an input 101 connected to the output 17 of the counter 19 and an input 103 connected to the output 7 of the separation circuit 3. The input 93 of the control circuit 39 is connected to the other input of the AND-gate 72.

In the control circuit 39, the television signal to be converted, which is applied to the input 45, is applied to an input 105 of a first write switch 107 and to an input 109 of a second write switch 111. Further inputs 113 and 115 of the first and second write switches 107 and 111, respectively, receive the write clock signal from the output 49 of the switch 47 during the active line writing periods.

Outputs 117 and 119 of the first and second write switches 107 and 111, respectively, are connected to inputs 121 and 123, respectively, of first and second field memories 125 and 127, of a memory circuit 129.

Outputs 131 and 133 of the first and second field memories 125 and 127, respectively, are connected to inputs 135 and 137, respectively, of a read switch 139, an output 141 of which applies the converted television signal to an output 143 of the conversion circuit. During the active line reading periods, an output 145 of the read switch 139 receives the read clock signal from the output 75 of the switch 73.

The first and second field memories 125 and 127 have respective clock signal inputs 147 and 149, respectively, connected to an output 151 of the first write switch 107 and to an output 153 of the read switch 139, and to an output 155 of the second write switch 111 and to an output 157 of the read switch 139.

The first and second write switches 107 and 111 have respective switching signal inputs 159 and 161, respectively, connected to the outputs of first and second write flip-flops 163 and 165.

The field memories 125 and 127 are of the serial type and have, for example, a memory length which corresponds to three hundred and eight active line writing periods. To ensure that these memories are written into properly, a write clock signal must be applied to them during groups of three hundred and eight successive line periods, independent of the number of lines of a field of a television signal to be converted. This is effected in response to the signals at the inputs 95, 97 and 99 of the control circuit 39. A pulse is produced at the input 95 at the third H' pulse, at the input 99 at the two hundred and fifty-ninth H' pulse and at the input 97 at the three hundred and eleventh H' pulse, from the beginning of the V pulse.

Set inputs of the first and second writing flip-flops 163 and 165 are connected to respective outputs of a change-over switch 167, an input of which is connected to the input 95 of the control circuit 39. The change-over switch 167 is operated by a signal received from an output 169 of a divide-by-two divider 171, the input of which is connected to the input 43 of the control circuit 39 and consequently receives the vertical synchronizing pulses V. The change-over switch 167 therefore occupies a different position from field to field, so that the first and the second write flip-flops 163 and 165 are set alternately by the signal at the input of the switch 167, i.e. at the third H' pulse after the V pulse. As a result thereof, during one field, the first field memory 125 and during the next field the second field memory 127, commences the writing operation at the third H' pulse after the beginning of the V pulse.

The reset inputs of the write flip-flops 163 and 165 are connected to respective outputs of a change-over switch 173, the input of which is connected to the input 97 of the control circuit 39. The change-over switch 173 is operated by a signal received from an output 175 of a D-flip-flop 177, the clock signal input 179 of which is connected to the input 99 of the control circuit 39 and the D-input 181 of which is connected to the output 169 of the divide-by-two divider 171. In response thereto, the same signal as has occurred at its input is produced at the output 175 of the D-flip-flop 177 with a time delay of two hundred and fifty-nine line periods. As a result thereof, the first write flip-flop 163 is reset in one field and the second write flip-flop 165 is reset in the next field, after they have been set in the above-described manner, resetting being effected by the signal at the input 97 of the control circuit 39, i.e. at the three hundred and eleventh H' pulse after the V pulse. Thus, the field memories 125 and 127 are alternately written into during three hundred and eight line periods, starting at the third H' pulse from the V pulse.

As the number of write line periods is independent of the number of lines of the field to be written-in, it may happen that in the event of a field length of less than three hundred and eight line periods, one field memory is still being written into while the other field memory is also being written into. In that case, the total available read period of each field memory becomes shorter than one field period.

Which field memory is read is determined by a signal applied to an input 183 of the read switch 139 and received from an output 185 of a D-flip-flop 187, whose clock signal input 189 is connected to the input 97 of the control circuit 39 and whose D-input 191 is connected to the output 175 of the D-flip-flop 177.

As a result thereof, the D-flip-flop 187 produces a signal which occurs three hundred and eleven H' pulses after the signal at the output 169 of the divide-by-two divider 171, so that immediately after a memory has been written into, the position of the read switch 139 becomes such that the memory 125 or 127 just written into can be read. This memory is then again written into via an output 193 or 195 of the read switch 139 in order to enable repeated reading after the first read operation has been effected, so that in the converted signal at the output 143, the field number is doubled relative to the signal to be converted at the input 1.

As explained above, the duration of the writing operation of a memory may be longer than a field period of the signal to be converted, so that less than one field period remains for two reading operations. Therefore, for the assumed memory length and an anticipated minimum number of lines to be processed in each field to be converted, which number is less than or corresponds to the memory length, the read clock frequency must be chosen to be slightly higher than twice the write clock frequency. In this case a factor of thirty-three sixteenths has been chosen. This can be realized in a simple way, since the read clock signal generator 51 is free-running. Thus, the converter circuit is usable for any number of lines per field.

Figure 2:
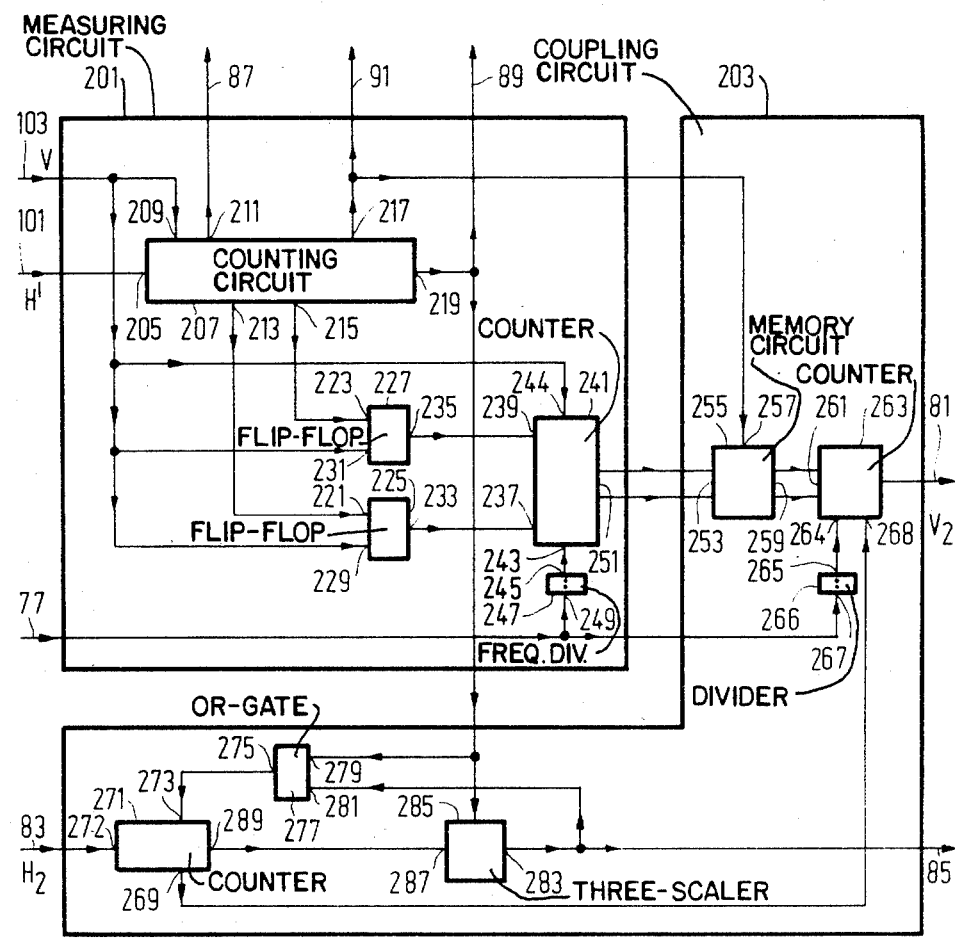
FIG. 2 illustrates, by means of a block diagram, the correction circuit of the embodiment shown in FIG. 1.

The correction circuit 79, which is shown in greater detail in FIG. 2, has for its object to make, in the case of different numbers of lines per field, and whether the associated television picture is interlaced or non-interlaced, the synchronizing signals for the converted television signal, such that the mutual vertical positions of the field of a picture which is displayed with the aid of the converted television signal corresponds to those of the fields of a picture corresponding with the television signal to be converted.

In FIG. 2 the inputs and outputs of the correction circuit 79 have been given the same reference numerals as in FIG. 1. The correction circuit comprises a measuring circuit 201 and a coupling circuit 203.

In the measuring circuit 201, the input 101 is connected to a counting signal input 205 of a counting circuit 207 and the input 103 is connected to a starting signal input 209 of the counting circuit 207.

The counting circuit 207 comprises a plurality of counters to which the counting signal received from the input 205 is applied. The first counter is adjusted to a starting position by the signal at the input 209 and then counts down to zero, whereafter it stops, the second counter then assuming a starting position and counting down to zero and stopping thereafter, as a result of which the third counter is thereafter adjusted to its starting position and starts counting down and so forth.

The counting circuit 207 has a number of outputs 211, 213, 215, 217 and 219 at which pulses appear, in succession, at, respectively, the third, the sixty-seventh, the one hundred and thirtieth, the two hundred and fifty-ninth and the three hundred and eleventh H' pulse after the beginning of the V pulse. The outputs 211, 217 and 219 of the counting circuit 207 are connected, respectively, to outputs 87, 91 and 89 of the correction circuit 79.

The outputs 213 and 215 of the counting circuit 207 are connected, respectively, to inputs 221 and 223 of set-reset flip-flops 225 and 227, whose other inputs 229 and 231 are both connected to the input 103 of the correction circuit 79. Outputs 233 and 235 of the flip-flops 225 and 227 are connected, respectively, to a counting direction signal input 237 and to a counting command signal input 239, of a counter 241, a counting signal input 243 of which is connected to an output 245 of a frequency divider 247. An input 249 of the frequency divider 247 receives the read clock signal from the input 77 of the correction circuit 79.

The frequency divider 247 divides by thirty-three. At a read clock signal frequency of thirty-three sixteenth times the write clock frequency of eighteen MHz opted for here, the counting signal frequency at the counting signal input 243 of the counter 241 is 1.1 MHz.

The counter 241 has a reset input 244 connected to the input 103, to which reset input 244 the vertical synchronizing signal V is applied.

From the output 235 of the flip-flop 227, the counting command signal input 239 of the counter 241 receives a signal which makes the counter 241 operative each time during a counting period which extends from the commencement of the vertical synchronizing signal V until one hundred and thirty-one pulses of the signal H' have been produced at the input 101 of the correction circuit 79.

From the output 233 of the flip-flop 225, the counting direction signal input 237 of the counter 241 receives a signal in response to which the counter 241 starts counting up from the beginning of the vertical synchronizing signal V until sixty-seven pulses of the signal H' have been produced at the input 101 of the correction circuit, whereafter the counter 241 starts counting down.

In response to the signals at its inputs 237, 239 and 244, the counter 241 counts up and down the number of periods of the signal applied to its input 243 and after each counting period has ended, this counter 241 is in a final position which is a measure of the instant at which the third H' pulse would have been produced after the commencement of the vertical synchronizing signal V. This instant is not measured directly, as the position of the third H' pulse is often too unstable because the phase control of the oscillator 25 has not as yet settled. (see FIG. 1). The influence of this instability is avoided by the above-described counting mode.

After each counting period has ended, the final position of the counter 241 is available at an output combination 251 of the counter 241. This final position is applied to an input combination 253 of a memory circuit 255 composed of, for example, D-flip-flops, and entered therein at the two hundred and fifty-ninth H' pulse after the commencement of the vertical synchronizing signal V, when a signal received from the output 217 of the counting circuit 207 is produced at a write signal input 257 of the memory circuit 255. This final position is then present at an output combination 259 of the memory circuit 255 during one field period of the television signal to be converted and, consequently, during a period of time in which two vertical synchronizing signals of the converted television signal occur.

The output combination 259 of the memory circuit 225 is connected to a counting position input combination 261 of a counter 263, to a counting signal input 264 of which a signal is applied from an output 265 of a divide-by-sixteen divider 266, an input 267 of which is connected to the input 77 of the correction circuit 79; a write signal received from an output 269 of a counter 271 is applied to a write signal input 268 of the counter 263. A counting signal input 272 of the counter 271 is connected to the input 83 of the correction circuit 79 and consequently receives the signal H$_2$.

The counter 271 is a three hundred and eight-counter, which is started from its zero position in response to a signal applied to its input 273 from an output 275 of an OR-gate 277, an input 279 of which is connected to the output 219 of the counting circuit 207. After it has been started, the counter 271 counts three hundred and eight H$_2$ pulses which are applied to its input 272, whereafter it stops again in its zero position.

A further input 281 of the OR-gate 277 is connected to an output 283 of a three-scaler 285.

The three-scaler 285 receives at its input 287 a pulse from an output 289 of the counter 271 each time this counter 271 is started. Of these pulses, the three-scaler 285 blocks each third pulse so that the counter 271 is started during a read cycle the first time by the signal at the input 279 of the OR-gate 277 and the second time by the signal at the input 281 of the OR-gate 277.

Every twenty line periods before the counter 271 has finished counting, it supplies from its output 269 a signal which, via the write signal input 268 of the counter 263, makes the position of this counter 263 equal to the position occurring at the output combination 259 of the memory circuit 255, which position will be designated T.

When the counter 271 starts, the counter 263 also starts at the position T and continues counting in response to the frequency of the signal at its input 264 until it has reached its final value M, whereafter it stops. As described above, the position T is determined by the position of the horizontal synchronizing pattern relative to a vertical synchronizing signal of the field to be converted of the television signal to be converted.

The time the counter 263 runs is proportional to (M-T). The maximum running period of the counter 263, corresponding to the value M is, for example, chosen to be somewhat longer than the line period of the converted television signal, for example forty microseconds. The position of the vertical synchronizing signal V$_2$ at the output 81 of the correction circuit 79, which is connected to the output of the counter 263, now becomes proportional to (M-T) relative to the horizontal synchronizing signal H$_2$, which determines the starting instant of the counter 263 via the output 269 of the counter 271 and the input 268 of the counter 263. A match to the frequency of the synchronizing signals in the converted television signal is obtained by means of the ratio of the frequencies at the inputs 243 and 264 of the counters 241 and 263, respectively.

Because of the choice of M, there may be a constant difference in the converted fields of the positions of the horizontal and vertical synchronizing signals relative to those in corresponding fields to be converted, which does not influence the display of a converted television signal.

As a result thereof, there is produced at the output 81 of the correction circuit 79 the vertical synchronizing signal V$_2$ for the converted television signal which, relative to the horizontal synchronizing signal H$_2$ and consequently to the read television signal at the output 143 of the conversion circuit, is in a position which is coupled to the position of the vertical synchronizing signal V of the television signal to be converted relative to the horizontal synchronizing signal H of this television signal.

Figure 3:
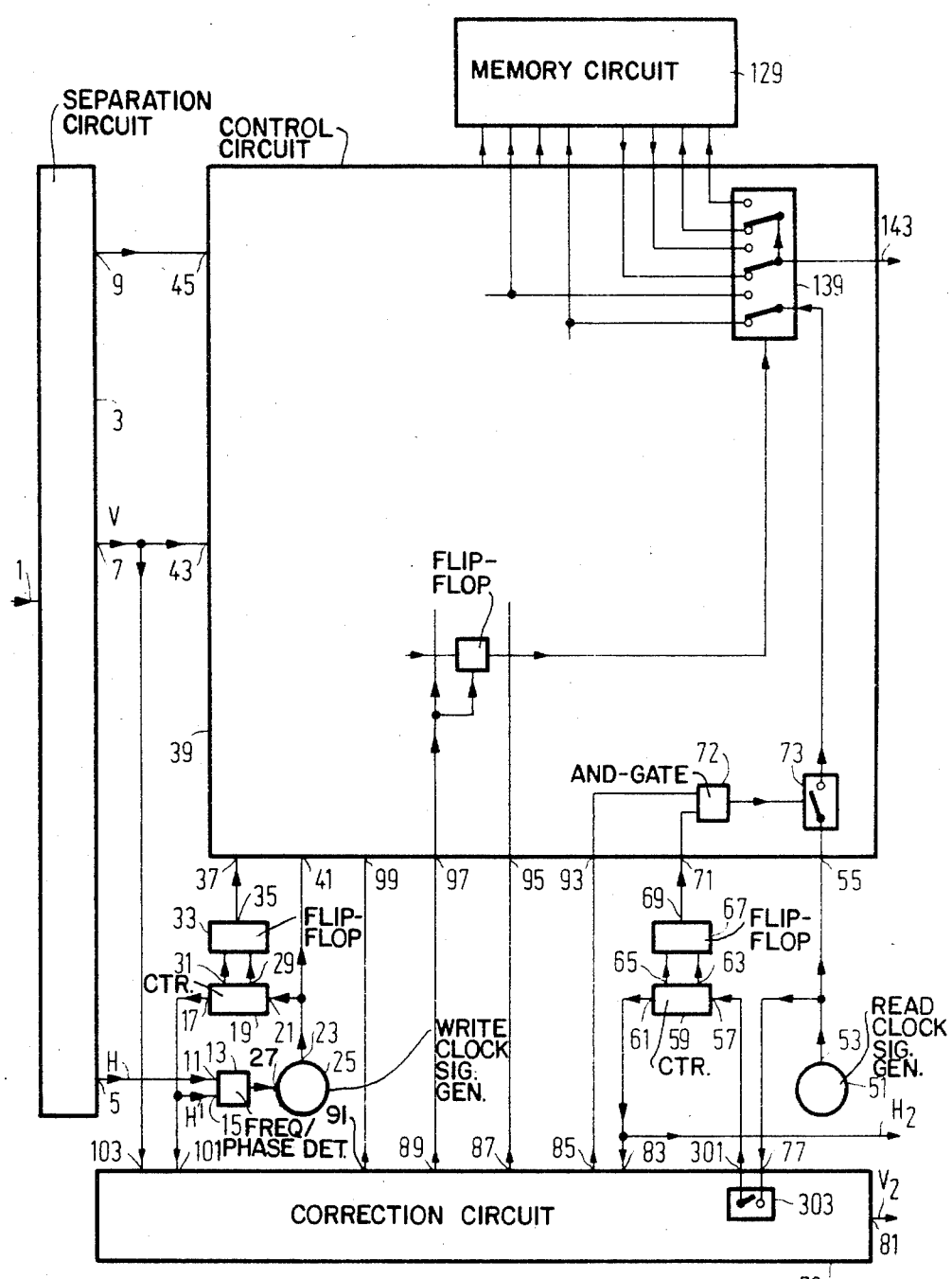
FIG. 3 illustrates, by means of a block diagram, another possible embodiment of a field number conversion circuit in accordance with the invention.

In FIG. 3 corresponding components are given the same reference numerals as in the preceding Figures. Reference is made to these Figures for their description.

The conversion circuit of FIG. 3 differs from the conversion circuit shown in FIG. 1 in that the input 57 of the counter 59 is not connected to the output 53 of the read clock signal generator 51 but rather to an output 301 of the correction circuit 79. This output 301 is connected to the input 77 of the correction circuit 79 via a switch 303. In further respects, the construction of the correction circuit 79 is different from the construction of the correction circuit of FIG. 2, this correction circuit 79 being shown in FIG. 4.

Figure 4:
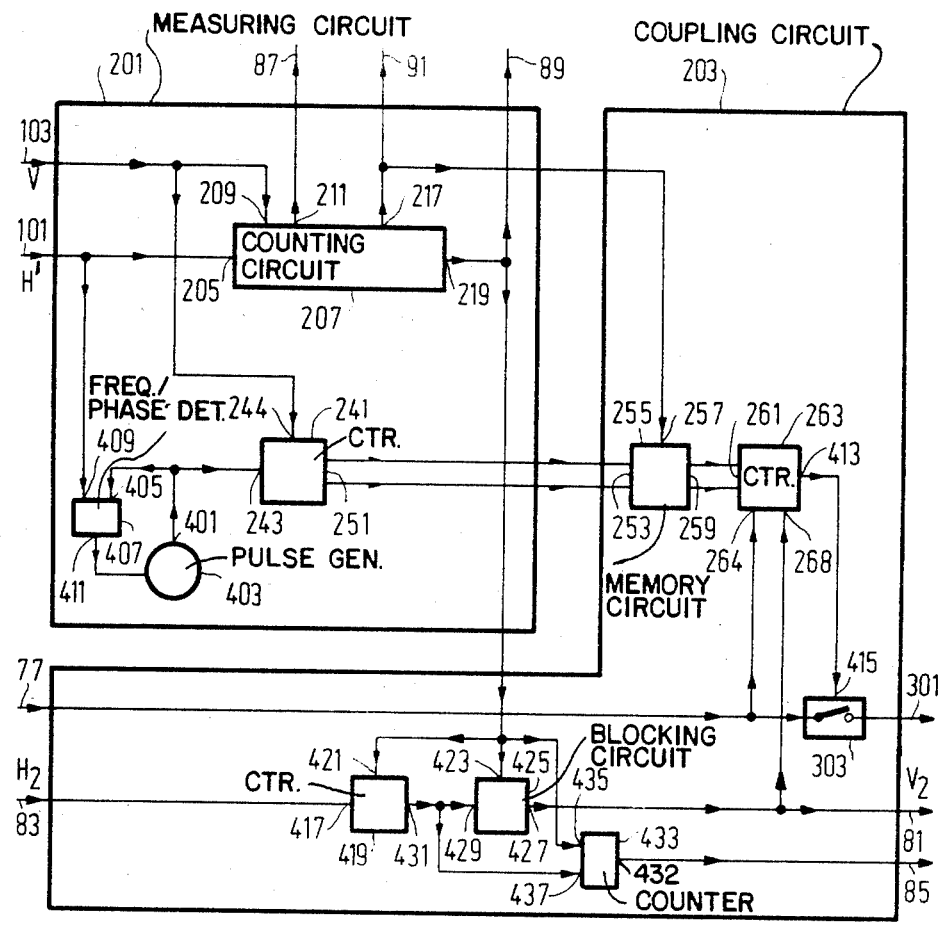
FIG. 4 illustrates, by means of a block diagram, the correction circuit of the embodiment shown in FIG. 3.

In FIG. 4 corresponding components are given the same reference numerals as in the preceding Figures, to which reference is made for their description.

The measuring circuit 201 differs from the measuring circuit of FIG. 2, in that the counting circuit 207 has no further outputs besides the outputs 211, 217 and 219, in that no counting direction signal and no counting command signal are applied to the counter 241, and in that the counting signal input 243 of this counter is connected to an output 401 of a pulse generator 403 which, on an average, generates the same frequency as the write clock signal generator 25. In addition, connected to the output 401 of this pulse generator 403 there is an input 405 of a frequency and phase detector 407, another input 409 of which is connected to the input 101 of the correction circuit 79 and an output 411 of which applies a control signal to the pulse generator 403. The frequency and phase detector 407 has a greater time constant so that in the period of time between two pulses of the signal H', the frequency of the signal produced by the pulse generator 403 does not significantly change, while the value of the time constant in the control loop of the write clock signal generator 25 is chosen small so as to render it possible that variations in the frequency of the horizontal synchronizing signal are followed rapidly.

From each start of a vertical synchronizing pulse, the counter 241 starts counting from its zero position and supplies at its output combination 251 the signals which represent the counting position. At the moment the counter circuit 207 has counted the two hundred and fifty-ninth horizontal pulse of the signal H', it applies, via its output 217, a pulse to the input 257 of the memory circuit 255, in response to which this memory circuit 255 stores the position of the counter 241 and makes it available at its output combination 259.

The counter 241 is in the form of a modulo-4N counter, N being the number representing the ratio between the write clock frequency and the horizontal synchronizing signal frequency. As a result thereof, no adding and subtracting operations need to be effected for converting the time interval from the two hundred and fifty-ninth H' pulse relative to the beginning of the vertical synchronizing pulse into the time interval from the third H' pulse relative to that beginning. Because of the modulo-4N counting operation, the subtracting operation of two hundred and fifty-six times N required therefor has already been effected since two hundred and fifty-six can be divided by four.

Thus, the counting position supplied by the memory circuit 255 from its output combination 259 is a measure of the time interval between the commencement of the vertical synchronizing pulse and the third H' pulse.

The vertical synchronizing signal $V_2$ of the converted television signal is applied to the write signal input 268 of the counter 263. It will be described hereinafter how this converted television signal is produced. In response thereto the output signal combination of the memory circuit 255 is transferred via the input combination 261 to the counter 263, which in response thereto supplies at its output 413, a signal which is applied to an input 415 of the switch 303 which is opened thereby. In response to the read clock signal applied to its counting signal input 264, the counter 263 is thereafter reset to its zero position, which is reached at the instant the position of the horizontal synchronizing signal relative to the vertical synchronizing signal of the converted television signal corresponds to the position of the television signal to be converted. The switch 303 is then closed which causes the read cycle to be started and also the generation of the horizontal synchronizing signals $H_2$ for the converted television signal is started, which generation operation is coupled therewith via the counter 59.

The vertical synchronizing signal $V_2$ for the converted television signal is generated in the following way. The horizontal synchronizing signal $H_2$ at the input 83 of the correction circuit is applied to an input 417 of a counter 419 which counts to three hundred and eight. This counter 419 is reset to zero by a signal applied to its input 421 and received from the output 219 of the counter circuit 207, which signal occurs at the end of a write cycle. This signal is also applied to an input 423 of a blocking circuit 425, which supplies from at an output 427 a pulse at the occurrence of the signal at the input 423 and at the first occurrence of a signal at an input 429, which is connected to an output 431 of the counter 419. This output 431 of the counter 419 supplies a pulse when a read cycle of one of the memories of the memory circuit 129 has been completed. Thus, the blocking circuit 425 only allows the first pulse at the end of the first read cycle to pass; the second pulse is blocked.

As a result thereof, a pulse occurs at the output 427 of the blocking circuit 425 at the end of a write cycle of one of the memories of the memory circuit 129 and at the end of the first read cycle. These pulses are not only applied to the read signal input 268 of the counter 263, but also to the output 81 of the correction circuit 79.

The output 85 of the correction circuit 79 is connected to an output 432 of a counter 433, which counts to three. A reset input 435 of this counter 433 is connected to the output 219 of the counting circuit 207 and a counting signal input 437 is connected to the output 431 of the counter 419. The counter 433 supplies from its output 432 a logic one-signal only during two read cycles, so that a third reading operation of the memory of the memory circuit 129 cannot be effected.

The vertical time base circuit for the display device must be of a direct current-coupled type, because of the differences in time intervals between a first and a second field deflection start, and between a second and a third field deflection start, occurring in the above-mentioned circuits.

Figure 5:
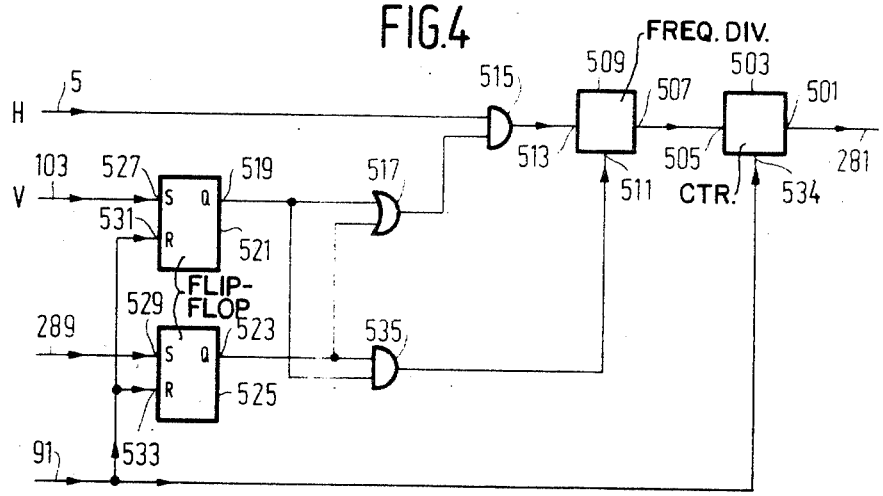
FIG. 5 illustrates by means of a block diagram a circuit to obtain a more uniform position of the display synchronizing signals for the conversion circuits of FIGS. 1 and 2.

These differences further cause a slight luminance flicker, which can be reduced by using a circuit as shown in FIG. 5, which is of such a construction as to be suitable for the conversion circuit shown in FIGS. 1 and 2, but which may also be used for the circuits shown in FIGS. 3 and 4.

In FIG. 5, the inputs 5, 103, 289, 91 and the output 281 of the circuit, which is used to obtain substantially equidistant vertical synchronizing signals, have been given reference numerals which correspond to the reference numerals for those points in the circuits shown in FIGS. 1 and 2 at which the same signals occur. The circuit shown in FIG. 2, is modified in that the connection between the output 283 of the three-scaler 285 and the input 281 of the OR-gate 277 is omitted. This input 281 is now connected to the output 281 of the circuit shown in FIG. 5.

At its output 281, the circuit of FIG. 5 supplies the starting signal for the second reading operation of a field memory. This starting signal must now occur halfway between the start of the first read operation and the start of the next write operation. It is obtained from an output 501 of a counter 503 whose length corresponds to half the standard field length for which the conversion circuit has been designed; in this case the counter 503 is a one hundred and fifty-six counter.

The counter 503 is started at the first of the pulses which indicate the end of the writing operation and the end of the field to be converted, which pulses occur at the inputs 289 and 103, respectively, and operates at half its rate in the period of time between these two pulses.

The counter 503 is controlled by a counting signal applied to an input 505 and obtained from an output 507 of a switchable frequency divider 509 which is capable of dividing by one or by two in response to a switching signal applied to its input 511. An input 513 of the switchable frequency divider 509 is connected to an output of an AND-gate 515, an input of which receives the horizontal synchronizing signals H from the input 5. A further input of the AND-gate 515 is connected to an output of an OR-gate 517.

The OR-gate 517 has an input connected to an output 519 of a flip-flop 521, and an input connected to an output 523 of a flip-flop 525.

At a set input 527, connected to the input 103, the flip-flop 521 receives the vertical synchronizing signal V whereas the end-of-writing signal is applied to an input 529 of the flip-flop 525 which input is connected to the input 289.

Reset inputs 531 and 533, respectively, of the flip-flops 521 and 525 are connected to the input 91, while a write signal input 534 of the counter 503 is also connected to the input 91. As a result thereof, some time before the end of a writing operation of a field memory the flip-flops 521 and 525 are reset and the counter 503 is adjusted to the position one hundred and fifty-five.

The outputs 519 and 523 of the flip-flops 521 and 525 are connected to two inputs of an AND-gate 535, an output of which is connected to the switching signal input 511 of the switchable frequency divider 509.

The first of the pulses entering via the inputs 103 or 289 sets one of the flip-flops 521 and 525 and the OR-gate 517 ensures that the AND-gate 515 conveys the horizontal synchronizing pulses H to the input 513 of the switchable frequency divider 509, which then divides by two as the AND-gate 535 is not yet conductive. The counter 503 then counts down at half its rate.

Also, the other one of the flip-flops 521 and 525 is set by one of the subsequent pulses entering via the inputs 103 or 289 and the AND-gate 535 conveys a signal to the switching signal input 511 of the switchable frequency divider 509 so that this divider divides by one and the counter 503 counts down to zero at its normal rate and then supplies the desired signal from its output 281, whereafter it stops.

It will be obvious that, if so desired, serial field memories of a different length or different types of field memories may be used, provided the other portions of the circuit are adapted thereto.

The read clock signal generator 51 must produce a signal having a stable frequency and is therefore preferably of the free-running type. It is possible, if so desired, to use frequency coupling to the write clock signal generator or to the horizontal synchronizing signals when that coupling is of such a nature that the frequency of the read clock signal generator can still be kept sufficiently stable.

The frequency of the signal counted by the counter 241 of the measuring circuit 201 may, as shown in the embodiments, be coupled to the write clock signal frequency or to the read clock signal frequency but, alternatively, if so desired, may be chosen independent of this clock signal frequency. The stability must be sufficient and its frequency sufficiently high to prevent visible position variations from occurring in the displayed fields.

In the measuring circuit 201 shown in FIG. 4 a modulo-4N counter 241 is used. If so desired, this may be a modulo-xN counter, wherein $x > \frac{1}{2}$, so that its counting period exceeds half a line period.

What is claimed is:

1. A field number conversion circuit for converting a television signal to be converted having a first field frequency into a converted television signal having a second field frequency, comprising a field memory circuit for writing therein for each field the television signal to be converted, a read clock signal generator which is frequency-coupled to the horizontal deflection frequency of the converted television signal, a control circuit for controlling writing and reading of the memory circuit, a circuit for obtaining display synchronizing signals for the converted television signal and a correction circuit for obtaining, for each field according to the position of the television signal to be converted in an associated picture, a corresponding position of the converted television signal in an associated picture, characterized in that the correction circuit comprises a measuring circuit for measuring in each field, the time interval between a field synchronizing signal of the television signal to be converted and an instant corresponding to a certain position in the relevant field of the picture, and for adequately transferring this time interval to a coupling circuit for coupling between the start of the reading operation and the display synchronizing signals of the converted television signal, so that in a field of the converted television signal, the mutual positions of the vertical and horizontal synchronizing signals and of the converted television signal correspond, except for a deviation which is substantially constant from field to field of the signal to be converted, to the mutual positions of the vertical and horizontal synchronizing signals and of the television signal to be converted in the corresponding field of the television signal to be converted.

2. A field number conversion circuit as claimed in claim 1, characterized in that the read clock signal generator is non-synchronized.

3. A field number conversion circuit as claimed in claim 1 or 2, characterized in that said time interval exceeds ten line periods of the television signal to be converted.

4. A field number conversion circuit as claimed in claim 1, characterized in that the memory circuit comprises serial field memories.

5. A field number conversion circuit as claimed in claim 4, characterized in that the control circuit comprises a circuit for simultaneously writing into two field memories during a portion of a write cycle when the field length of the television signal to be converted is less than or corresponds to the field memory length.

6. A field number conversion circuit as claimed in claim 1, 4 or 5, characterized in that the measuring circuit comprises an up-down counter having a reset input for receiving a vertical synchronizing signal of the television signal to be converted, a counting signal input coupled, via a frequency divider, to an output of the read clock signal generator, and a counting command signal input and a counting direction signal input which are coupled to a circuit which determines the counting-up and counting-down period.

7. A field number conversion circuit as claimed in claim 1, 4 or 5, characterized in that the measuring circuit comprises a modulo-xN counter wherein $x > \frac{1}{2}$ and N is the ratio between the frequency of the counting signal to be applied to a counting signal input of the counter and the line frequency of the television signal to be converted, whereas the counter has a reset input for receiving a vertical synchronizing signal of the television signal to be converted.

8. A field number conversion as claimed in claim 1, 4 or 5, characterized in that it comprises a circuit for obtaining substantially equidistant time intervals of the vertical synchronizing signals of the converted television signal.

* * * * *